US006780265B2

(12) United States Patent
Bleckmann et al.

(10) Patent No.: US 6,780,265 B2
(45) Date of Patent: Aug. 24, 2004

(54) METHOD AND APPARATUS FOR PRODUCTION OF LABELS

(76) Inventors: Frederick Bleckmann, 117 Silver St., Dover, NH (US) 03820; Gilbert A. Bleckmann, 5 Fayette St., Pittsfield, NH (US) 03263

(*) Notice: Subject to any disclaimer, the term of this patent is extended or adjusted under 35 U.S.C. 154(b) by 33 days.

(21) Appl. No.: 10/167,117

(22) Filed: Jun. 11, 2002

(65) Prior Publication Data

US 2002/0148549 A1 Oct. 17, 2002

Related U.S. Application Data

(63) Continuation of application No. 09/603,234, filed on Jun. 26, 2000, now Pat. No. 6,432,235, which is a continuation of application No. PCT/US00/04623, filed on Feb. 23, 2000, now Pat. No. 6,432,235.
(60) Provisional application No. 60/121,817, filed on Feb. 25, 1999.

(51) Int. Cl.[7] .............................................. B32B 31/18
(52) U.S. Cl. .................... 156/73.1; 156/73.3; 156/200; 156/204; 156/251; 156/465; 156/515; 156/580.1; 428/98
(58) Field of Search .................. 156/64, 73.1, 73.3, 156/200, 204, 251, 510, 515, 580.1, 580.2, 250, 465; 428/98

(56) References Cited

U.S. PATENT DOCUMENTS

| | | | |
|---|---|---|---|
| 3,691,346 A | 9/1972 | Dyre | |
| 4,474,637 A | 10/1984 | Kempf | |
| 4,500,372 A | 2/1985 | Mion | |
| 4,752,351 A | 6/1988 | Lunt | |
| 4,847,934 A | 7/1989 | Weber | |
| 5,435,863 A | 7/1995 | Frantz | |
| 5,441,710 A | 8/1995 | Marois | |
| 5,583,489 A | 12/1996 | Loemker et al. | |
| 5,745,036 A | 4/1998 | Clare | |
| 5,785,181 A | 7/1998 | Quartararo | |
| 5,863,383 A | 1/1999 | Bussey | |
| 5,874,050 A | 2/1999 | Matias | |
| 5,874,896 A | 2/1999 | Lowe | |
| 5,874,902 A | 2/1999 | Heinrich | |
| 5,932,041 A | 8/1999 | Dolling | |
| 5,948,208 A | 9/1999 | Speich | |
| 6,432,235 B1 * | 8/2002 | Bleckmann et al. | ....... 156/73.1 |

FOREIGN PATENT DOCUMENTS

| | | |
|---|---|---|
| DE | 2624055 | 2/1978 |
| IT | 1124421 | 5/1986 |
| IT | 1222721 | 9/1990 |
| WO | WO 00/73559 | 12/2000 |

OTHER PUBLICATIONS

USC and USC 50 Ultrasonic cutters.

* cited by examiner

Primary Examiner—James Sells
(74) Attorney, Agent, or Firm—Nixon Peabody LLP

(57) ABSTRACT

The present invention provides a method and apparatus for producing individual folded labels from a ribbon of labels designed to satisfy the aforementioned needs. The label is formed by first providing a ribbon of labels with at least one folded over portion and then subjecting the folded ribbon to heat and pressure to set the fold. The folded pressed ribbon is then subdividing into individual labels. In an alternative embodiment, the folded and pressed ribbon can be rerolled and shipped to an end user for use in an auto-sewing device. The present invention further includes an apparatus for carrying out this method and a finished label.

45 Claims, 17 Drawing Sheets

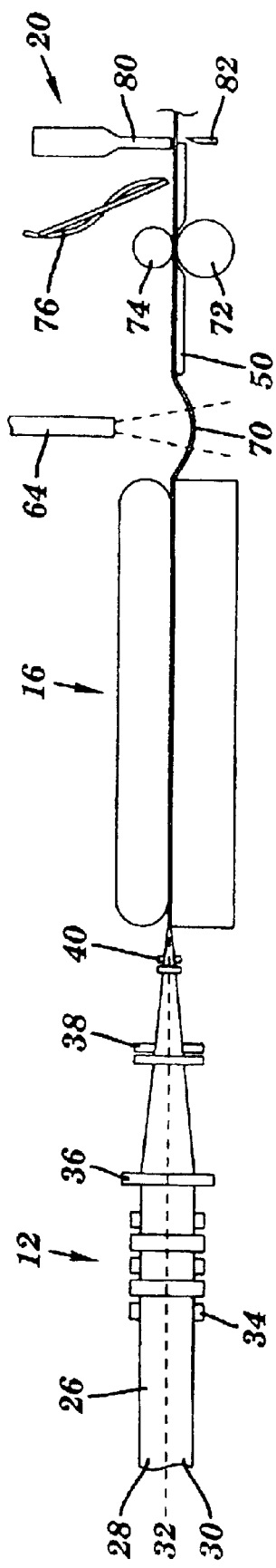
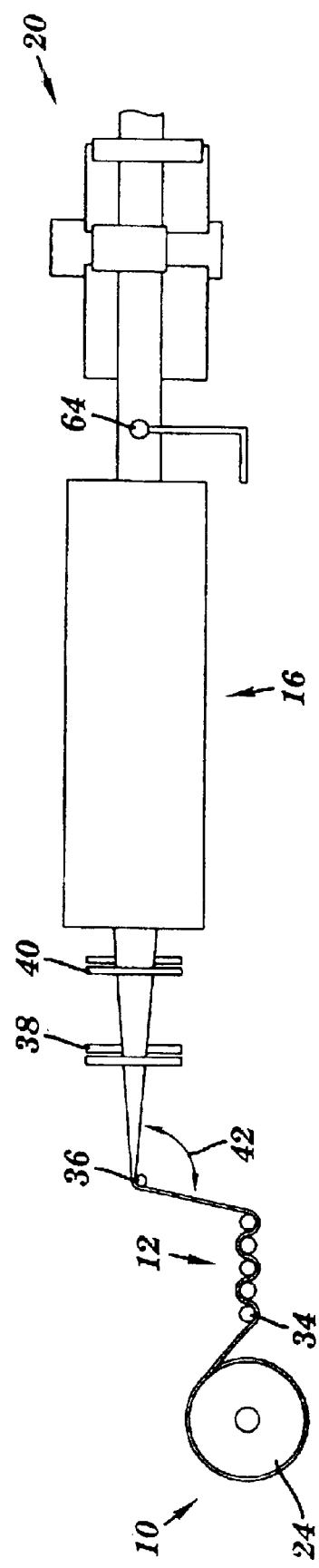

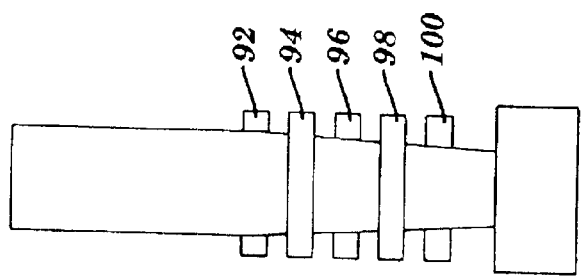
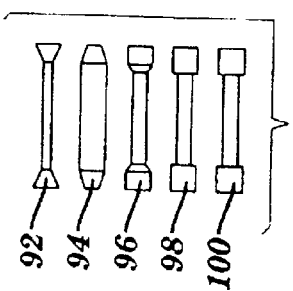
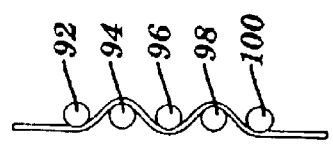
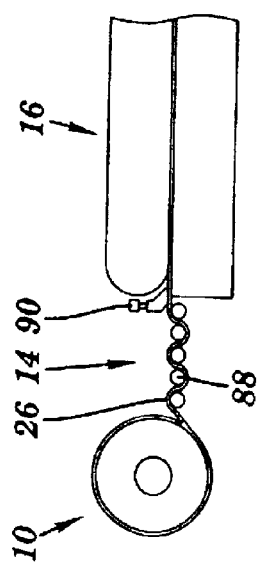
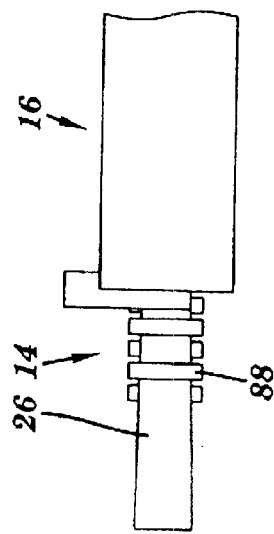

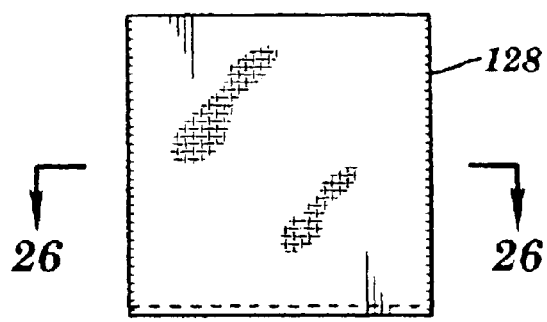
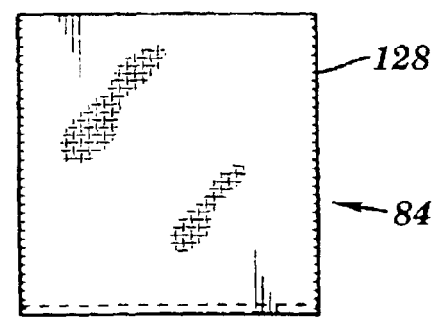
FIG. 24  FIG. 25
FIG. 26

METHOD AND APPARATUS FOR PRODUCTION OF LABELS

CROSS-REFERENCE TO RELATED APPLICATIONS

This application is a continuation application of U.S. Ser. No. 09/603,234 filed on Jun. 26, 2000 now U.S. Pat. No. 6,432,235, which is a continuation application of International Application No. PCT/US00/04623 filed on Feb. 23, 2000, which claims priority benefit of U.S. Provisional Application No. 60/121,817 filed on Feb. 25, 1999.

FIELD OF INVENTION

The present invention relates to a method and apparatus for production of folded labels for application to clothing, linens, towels, and other goods. The present invention further relates to a label produced by the method of the invention.

BACKGROUND

The attachment of labels to cloth goods such as clothing, linens, and towels is a common practice used to set forth information such as trademarks and trade names, material identification and characteristics, sizes, care instructions, and so forth. Legal requirements necessitate the use of labels in clothing or on linens.

Folded labels are commonly used in the industry and come in a number of different forms including endfolds, centerfolds, J folds, Booklet fold, Manhattan-folds, and mitrefold labels. While each of these different forms has a particular use, the centerfold and end-fold labels are the most popular. FIG. 1 illustrates a centerfold label 2 in a shirt. FIGS. 2–4 illustrate different views of an end fold label of the present invention. While FIGS. 5–7 illustrate different views of a Manhattan fold label of the present invention.

In addition to providing this important information, the label is part of the object. Unfortunately, it is not unusual for a label, especially a skin contact clothing label, to irritate the customer. This can result in the customer forming a negative attitude regarding the quality of the entire garment. Quite often the customer will cut the offending label out of the garment. This not only prevents the customer from having the proper care instructions; it also removes the product identification from the garment, further reducing repeat sales.

Currently most folded labels are produced using what is referred to in the industry as the "cut and fold" technique, that is the labels are indexed, cut from a ribbon of material and then folded. Using this technique about 40–220 labels can be produced a minute with between 5–20% of the labels being considered waste or defective. The most common defect being a distorted fold resulting in the ends (6) of the label (4) not aligning properly, as illustrated in FIG. 8. Other defects include turned corners, fanning, and protruding fold unders.

Defective labels can significantly increase the cost of the goods. For example, while it costs only about fifteen to twenty-five cents to sew a label into a garment in the United States, it can cost five to ten times this amount to replace a defective label. Many labels, especially centerfold, have a tendency to skew while being sewed, thereby increasing the chance for a poor impression. If the defective label is not detected and replaced, the goods may have to be classified as seconds and sold at a steep discount. Significantly, if the identification of the defective label is missed it is likely to be recognizable by the customer and adversely affect the overall impression of the goods.

It would be desirable to be able to produce folded labels that are more comfortable to the apparel customer than current labels, at a higher speed and greater efficiency of production for both label and end product manufacturers, and with fewer defects than current methods.

There are systems that produce printed labels by first folding a tape imprinted with a label design and then, with a cold knife, cutting the folded tape. Such a system is utilized by Scatto-GI Due's (Italy) CONCORD printer. However, the system employed using the CONCORD unit would not be suitable for used with woven fabrics.

SUMMARY OF THE INVENTION

We have surprisingly discovered that the sequential steps of folding a ribbon of labels, pressing the folded label with heat to set the fold and subdividing the pressed ribbon into individual labels using ultrasonic means results in individual folded labels that are soft to the touch have edges that are generally scratchless to the apparel consumer and virtually free of defects. The improved feel of the labels produced in accordance with the present invention assures that label will remain on the garment when the customer is ready to reorder. Additionally, the use of ultrasonic means to subdivide the labels results in a label having the front and back folds sealed together thus preventing the label from being skewed when sewed into a garment. This makes the sewing step more efficient and results in a reduced number of finished goods being classified as seconds. Thus providing added cost savings to the garment manufacturer. Furthermore, the present invention allows for the production of labels at a rate of from 200 to over 1000 per minute at efficiencies better than 90% at a waste less than 4%. This is significantly higher than the 40–220 labels per minute produced using the current "cut and fold" technique.

The present invention provides a method and apparatus for producing individual folded labels from a ribbon of labels designed to satisfy the aforementioned needs. The label is formed by first providing a ribbon of labels with at least one fold and then subjecting the folded ribbon to heat and pressure to set the fold. In one embodiment, the folded pressed ribbon is indexed and then ultrasonically subdivided into individual labels. In an alternative embodiment, the folded and pressed ribbon is rerolled and shipped to an end user for use in an auto-sewing device. The present invention further includes an apparatus for carrying out this method as well as labels producing in accordance with the method.

The present invention also provides for insertion of a device such as an antenna, computer chip, radio frequency inventory/antitheft control devices, acoustical, magnetic or other security or inventory devices within the folded label. Such devices may be part of a web or laminate. After insertion of the device, edges of the label can be sealed using known techniques, preferably ultrasonics. As will be discussed in more detail below, such a device can be inserted before or after the folding step.

In one embodiment the apparatus of the present invention comprises a folding station and a press station. In a preferred embodiment, the apparatus further comprises a cutting station. The folding station comprises a series of guides that provide the ribbon with at least one folded over portion that when cut will result in a label having the desired configuration. Such configurations include endfold, centerfold, J fold, Manhattan-fold, and mitrefold. See FIGS. 1–7 and 24. The apparatus of this present invention may have several different folding stations or interchangeable folding stations, thus allowing the user to select different fold configurations. Alternatively, there may be a series of components that function in one overall device. The press and cutting stations are electronically linked by means of at least one sensor to coordinate operation.

In a preferred embodiment, the apparatus of the present invention comprises a tension control assembly to control tension from the roll of ribbon of material through the folding station and into the press unit. In this preferred embodiment, the device further comprises a folding station, press unit, indexing assembly and an ultrasonic cutting station.

The press station of the apparatus of the invention includes a heated platen to subject the ribbon to heat and pressure to lock in the fold and provide the product with a soft feel when polyester or like materials are used. The amount of heat and pressure is selected based on the ribbon material. The press station includes a mechanism for linear advance of the ribbon from the ribbon dispenser through the folding station. The linear advance mechanism can include, for example, a conveyor belt positioned below the platen or a pair of nip rolls positioned downstream from the platen. The folded and pressed label can be rerolled and shipped to an end user for use in an auto-sewing device. Alternatively, the folded pressed ribbon is passed through the indexing assembly and then sent to the cutting station where it is ultrasonically subdivided into individual labels.

The apparatus can further comprise an insertion assembly to insert a device, such as those discussed above, into the label. The insertion assembly can be positioned before or after the folding station or after indexing. In any embodiment the apparatus can be configured for left or right-hand operation to allow a user to operate more than one unit.

Other aspects of the invention as disclosed infra.

BRIEF DESCRIPTION OF THE DRAWINGS

FIG. 10 is a schematical side view of an embodiment of the present invention.

FIG. 11 is a schematical top view of the embodiment of FIG. 4.

FIG. 18 is a schematical side view of an alternative embodiment of the present invention.

FIG. 19 is a schematical top view of the embodiment of FIG. 18.

FIGS. 20A, 20B and 20C illustrate an arrangement of folding rods used to produce an end fold.

FIG. 24 is a front view of a centerfold label.

FIG. 25 is a back view of the label of FIG. 24.

FIG. 26 is a cross sectional view of the label of FIG. 24 along line 26—26.

DESCRIPTION OF THE INVENTION

Figure 9:
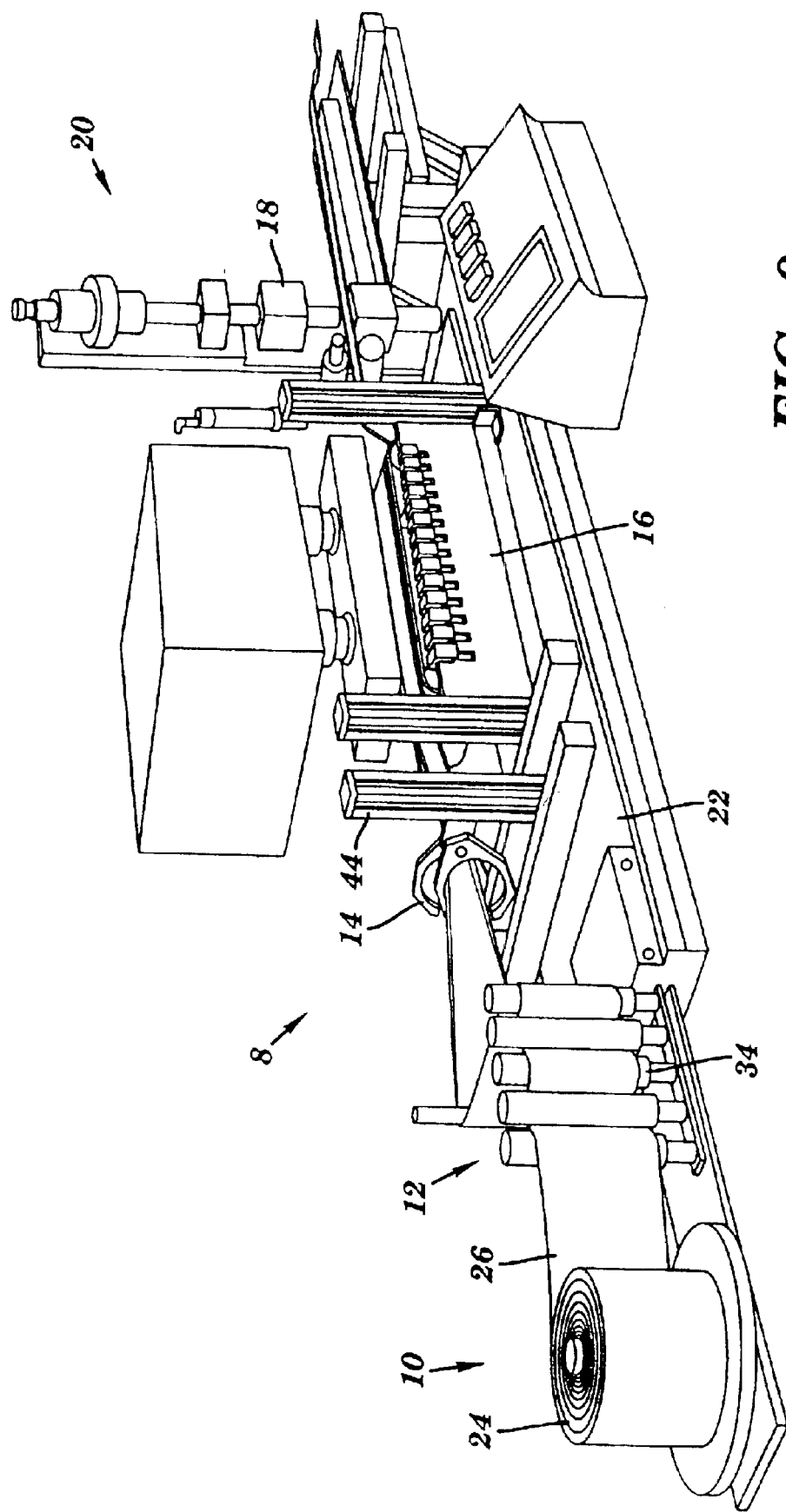
FIG. 9 is a perspective view of an apparatus of the present invention.

Referring now to the drawings, and more particularly, to FIG. 9, there is shown a perspective view of a label producing apparatus of the present invention, in the centerfold configuration, generally designated 8, which comprises one embodiment of the present invention. The apparatus of the embodiment of FIG. 9 comprises a tension let off device 10, a tension equalizer assembly 12, a folding station 14, a pressing station 16, indexing assembly 18 and a cutting station 20 mounted on a base or table 22.

As shown in FIG. 9, a roll 24 of a ribbon of material containing labels 26 is placed on tension let off device 10. Regulating tension from let off device 10 to press station 16 is important for controlling the ribbon of material 26 during the folding process. As shown in FIG. 10, the upper edge 28 and lower edge 30 of the material 26 must be maintained at essentially equal tensions. The centerline 32 of material 26, as shown in FIG. 10, is the main control for this adjustment. Centerline 32 is preferably setup equal to the centerline of the press unit 16 and the folding station 14. Raising or lowering the roll 24 from this point can be done to equalize the tensions in the upper and lower edge of the material.

The ribbon of material 26 can be composed of virtually any material that can be cut and pressed including a thermoplastic material (e.g., polyester), acetate, cotton, nylon, linen, paper, rayon and combinations thereof, in woven and non-woven form. Polyester is preferred. The labels can be printed or woven. Woven is preferred.

It is preferred that the logo of the label is made such that it is 90 degrees from the typical orientation used in broadloom, needeloom or shuttleloom weaving of woven labels. For woven labels this can be readily done on existing harness repeats. The change of orientation greatly reduces "window shading" (curling after laundering) and decreases shrinkage when the product is exposed to heat at temperatures above 275° F.

As shown in FIGS. 9, 10 and 11 the ribbon of material 26 is then guided through a series of adjustable equalizing rollers 14 that make up the tension equalizer assembly 12 to provide an even distribution of tension. After emerging from the equalizing rollers, the ribbon is guided over a folding rod 36. It is preferable that the location of folding rod 36 be kept in center with folding lenses 38 and 40 along centerline 32. The folding rod 36 is square to base 22. Material angle 42 (FIG. 5) is kept from 5°–170°, more preferably 30°–90°. The distance from folding rod 36 to press unit 16 is dictated by the loom cut width of the material being folded. The wider the tape/ribbon cut the further folding rod 36 is located from press unit 16.

After passing over the folding rod 36, the ribbon of material 26 enters folding station 14. For producing a centerfold label, as shown in the embodiment of FIGS. 9, 10 and 11, the folding station 24 comprises two folding lenses 38 and 40. The folding lenses can be seen most clearly in FIG. 12. Folding lenses 38 and 40 are pivotally mounted on supports 44 and can be adjusted vertically. The lenses are a caliper-like device comprising two adjustable jaws 46. The lenses restrain and guide the material into an even consistent fold. Lens 38 is a guiding lens used for making for slight adjustments before the material enters lens 40, the working lens that brings the ribbon to a fold. In certain situations a proper fold can be obtained using more or less that two lenses.

Figure 13:
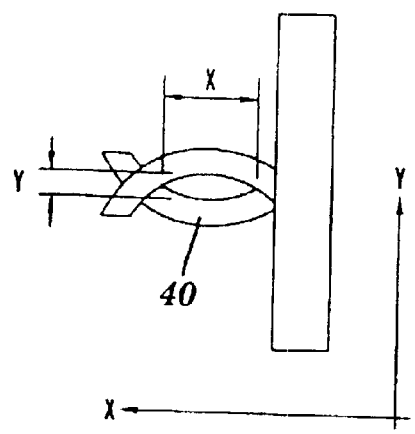
FIG. 13 illustrates a folding lens.

As illustrated in FIG. 13, it is preferred that the distance x on lens 40 be ½ of the loom cut width +1.5 mm or −1.5 mm depending on the thickness and stability of the material being processed. The Y distance should allow for even flow of material. Changing lenses to a larger or smaller diameter may be necessary for widths over 120 mm or below 50 mm.

Figure 1:
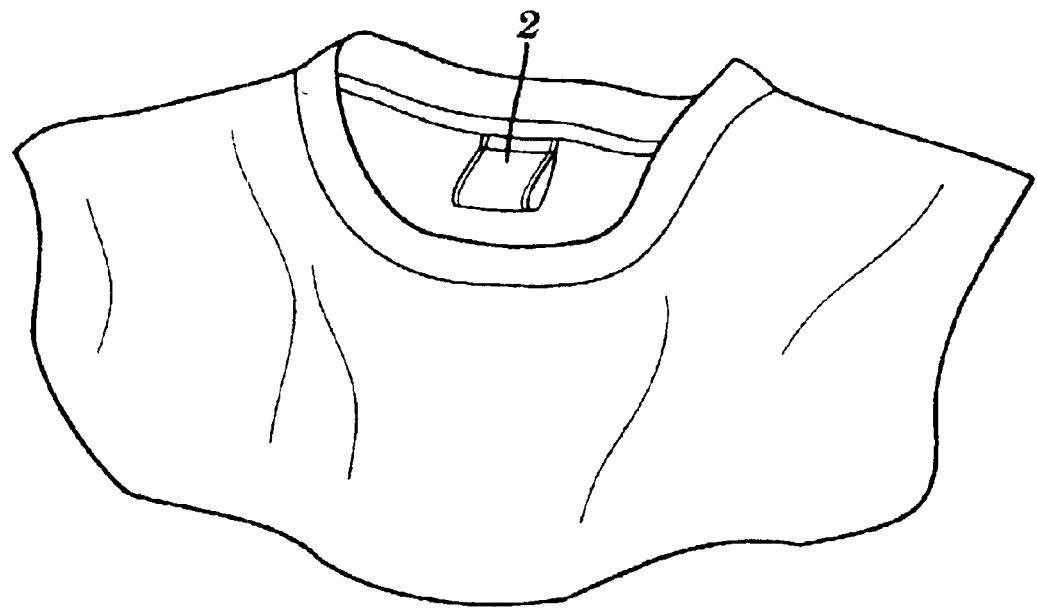
FIG. 1 illustrates a centerfold label 2 in a shirt.
Figure 8:
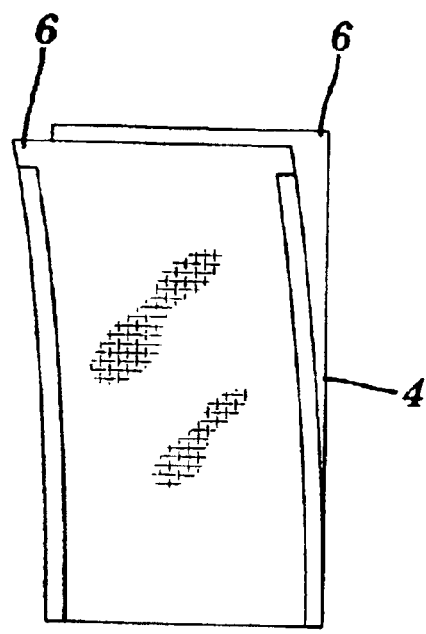
FIG. 8 illustrates a centerfold label having a distorted fold.

Movement of lens 40 in the +x-axis (FIG. 8) direction will create a larger top fold. Movement of lens 40 in the −x-axis direction will create a larger bottom fold. Placement of the y-axis for both lens 38 and 40 is along centerline 32 (FIG. 10). If the material has a tendency to twist then an angle downward or upward may be set on either lens.

Figure 12:
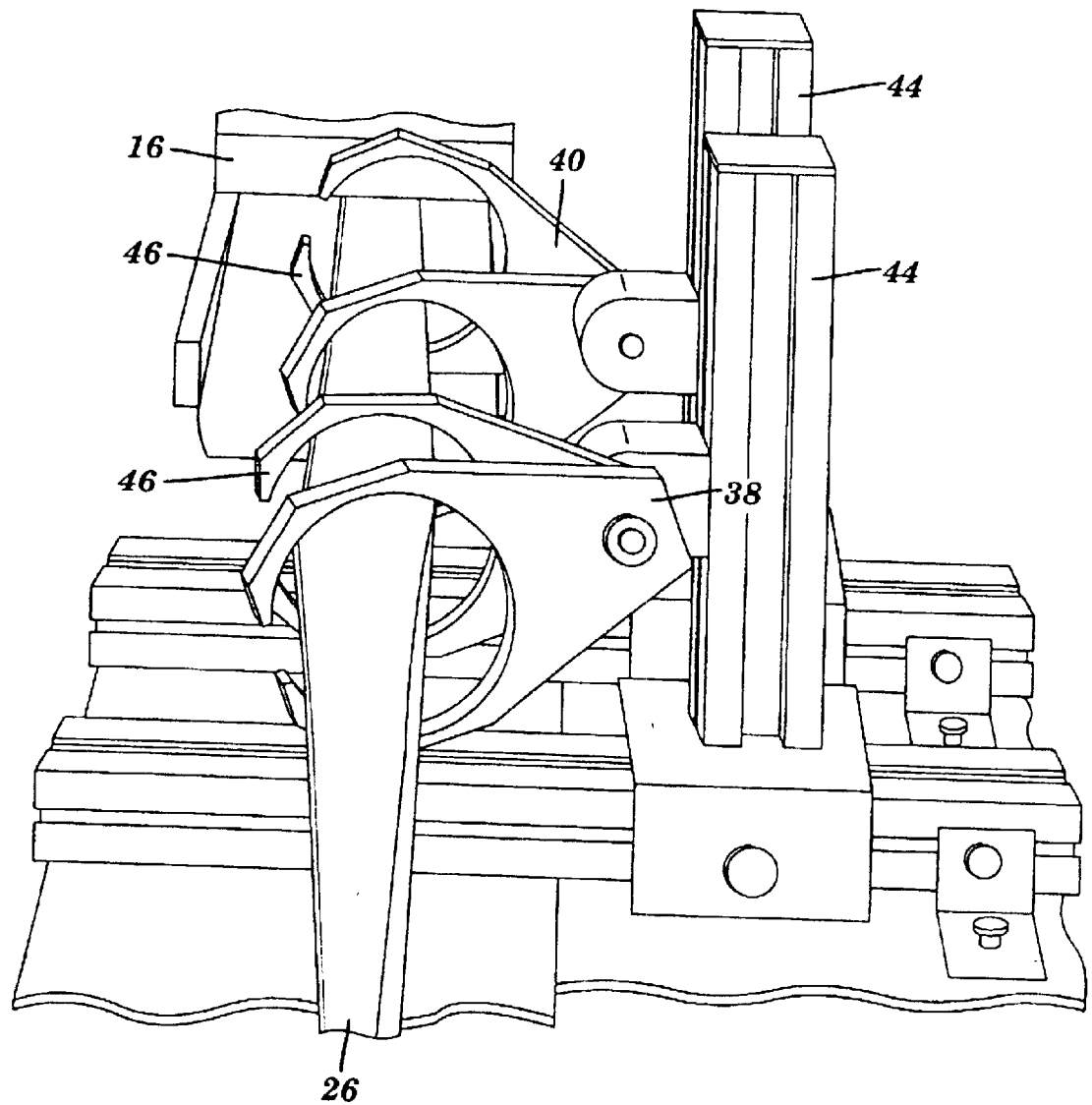
FIG. 12 is an end view of the left side of the apparatus of FIG. 9 showing a ribbon going through the folding station into the press unit.
Figure 14:
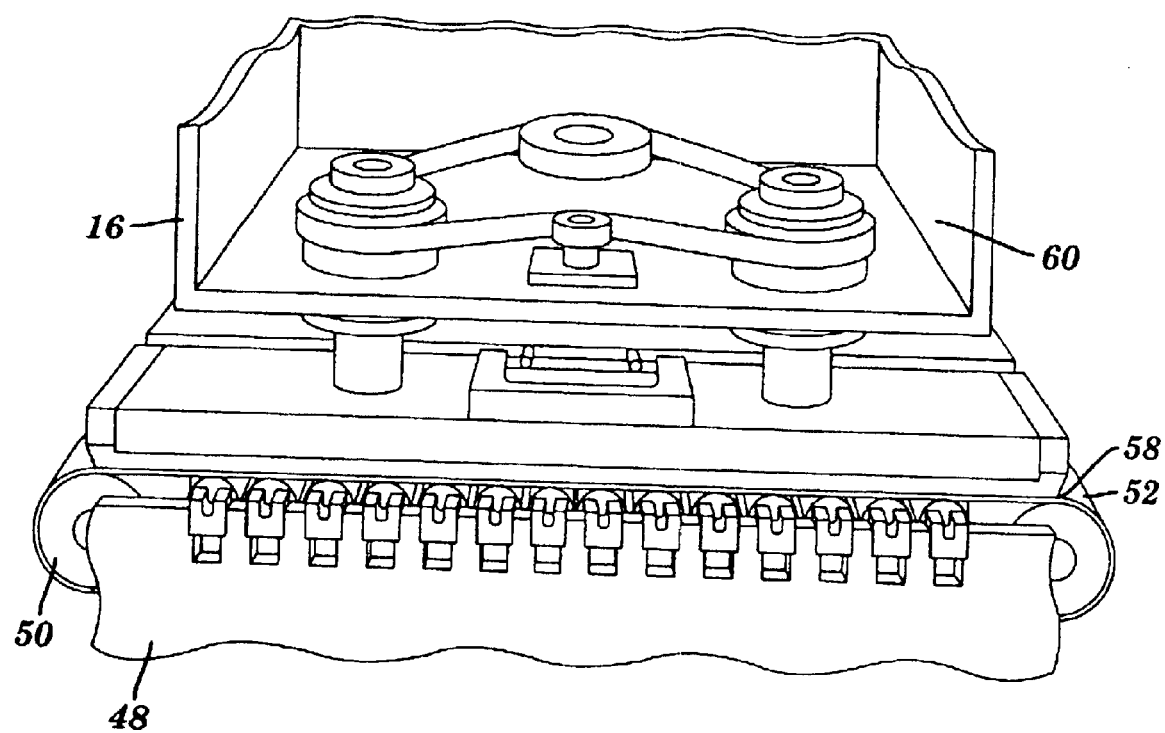
FIG. 14 is a front view of the press station of the embodiment of FIG. 9.
Figure 15:
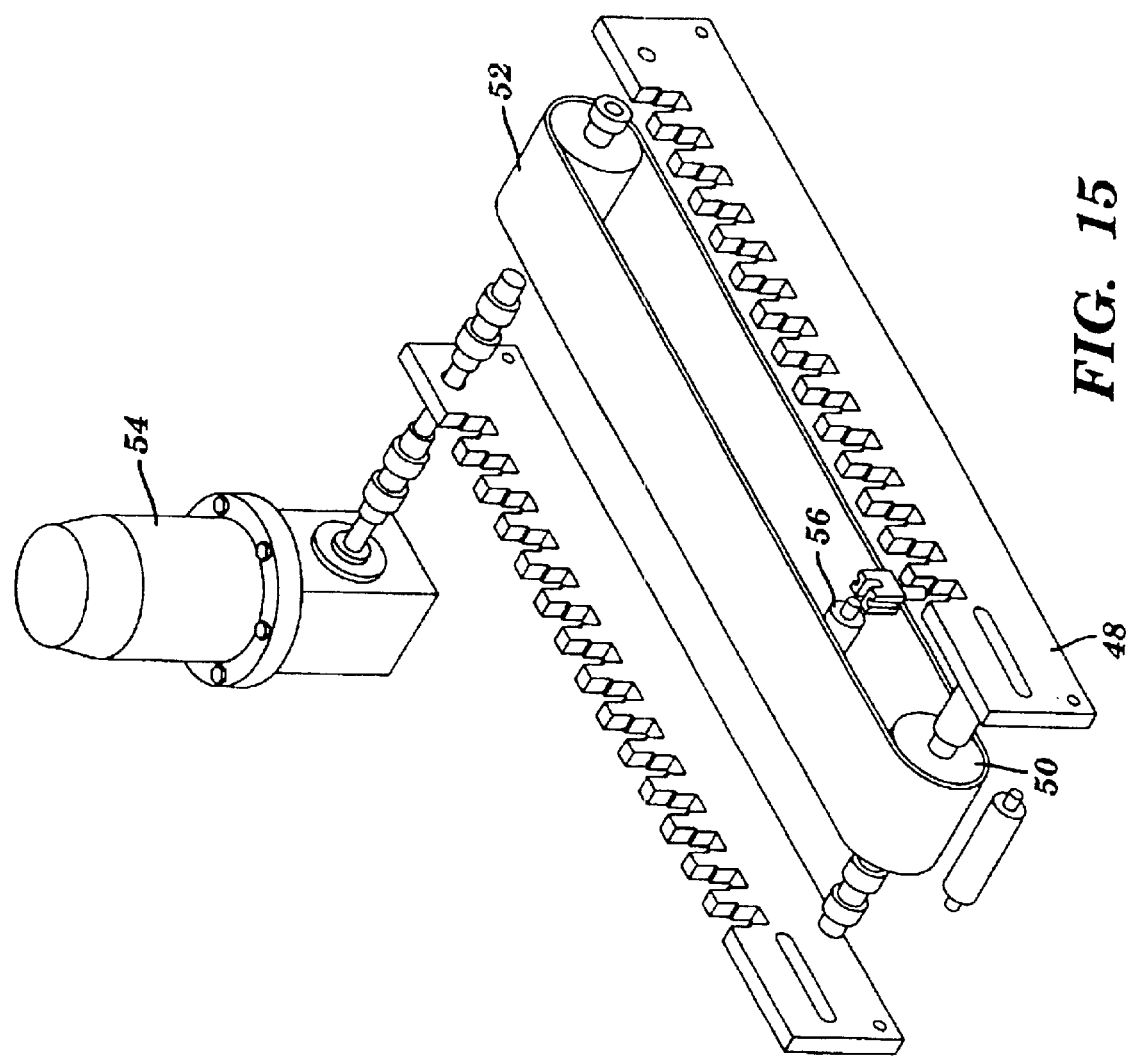
FIG. 15 is an exploded view of the conveyor drive mechanism of the press station of the embodiment of FIG. 9.

As can be seen in FIG. 12, the folded material exits the folding station 14 and enters press station 16. The press station 16 subjects the folded material to both heat (100°–400° F.) and pressure. A range of pressure between 5–80 pounds of force is preferred. As illustrated in FIGS. 14 and 15, in one embodiment the press unit includes a support frame 48 (part of which has been cut away in the figure to show details) upon which are movably affixed belt rolls 50 about which is positioned a high temperature resistant endless conveyor belt 52. The belt may be driven at selected, controlled, constant speeds by known means such as an AC or DC electric drive motor 54 and speed regulator or controller. Between the affixed belt rolls 50 are a series of rollers 56, spring mounted to the support frame, upon which the top of the conveyor rides.

As shown in FIG. 14, mounted above the conveyor belt 52 is a platen 58 affixed to a motor driven screw gear actuating mechanism 60 by which the platen 58 may be moved upward and downward. The platen is heatable by means of electrically energized calrods or other known heating devices attached to a heat control unit (not shown).

Figure 16:
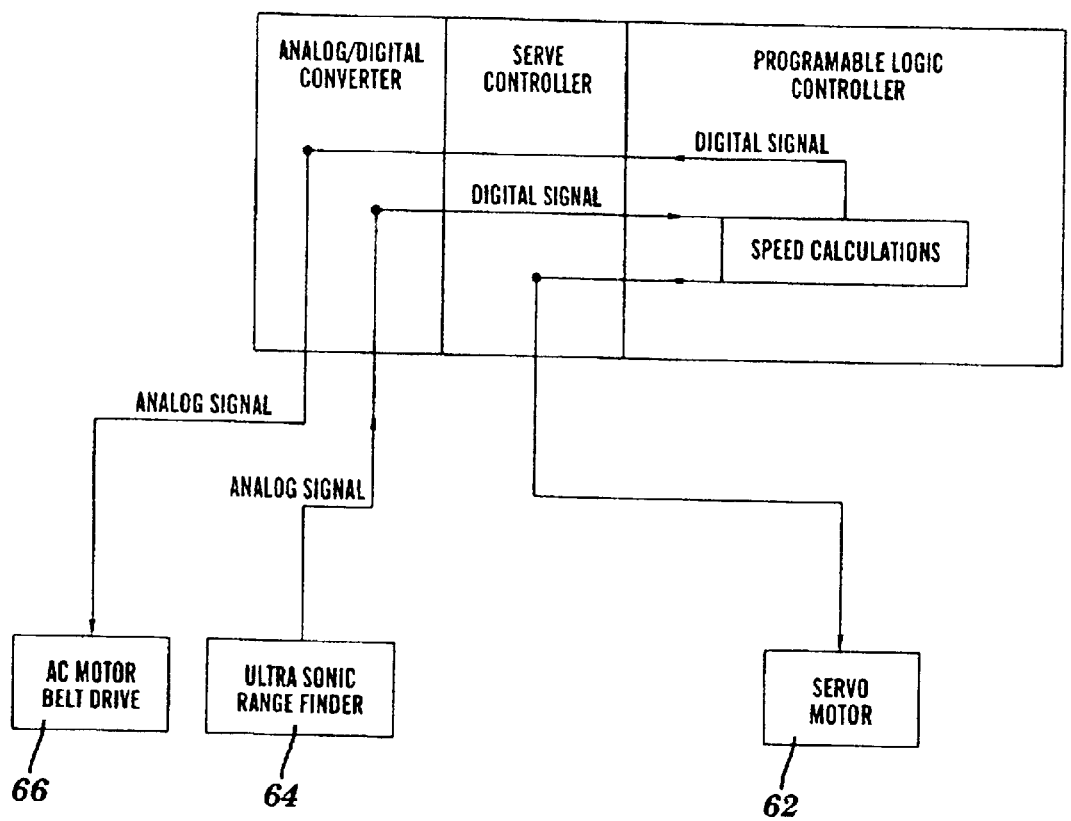
FIG. 16 diagram of a representative speed control system.

The speed of the press station motor can be trimmed with an ultrasonic rangefinder that is wired into the motor controller inside the unit. A diagram of a representative speed control system is illustrated in FIG. 16. In FIG. 16, a speed signal is sent to the servomotor 62. From this signal a calculation is made and held in memory. The ultra sonic range finder 64 makes a reading of the slack of material as it travels between press station 16 and cutting station 20 (FIG. 9). This is added to the number held in memory and this sum is sent to the belt drive motor 66 to control belt speed.

The press station 16 can have multiple heat zones that can be controlled separately. The first heat zone can be designed to carry most of the heat and the heat zones can be designed as a cool down area. The settings of the press station 16 are dictated by the type of material being processed. Thicker materials require a higher press setting and more heat, while thinner materials require less.

In the embodiment depicted in the figures, the folded material travels though the press unit via a conveyer mechanism, depicted in more detail in FIG. 15. It is this conveyor mechanism that provides a linear advance pulling the ribbon from the tension let off device 10 through the folding station 14. Other mechanisms for linear advance can be used.

Figure 17:
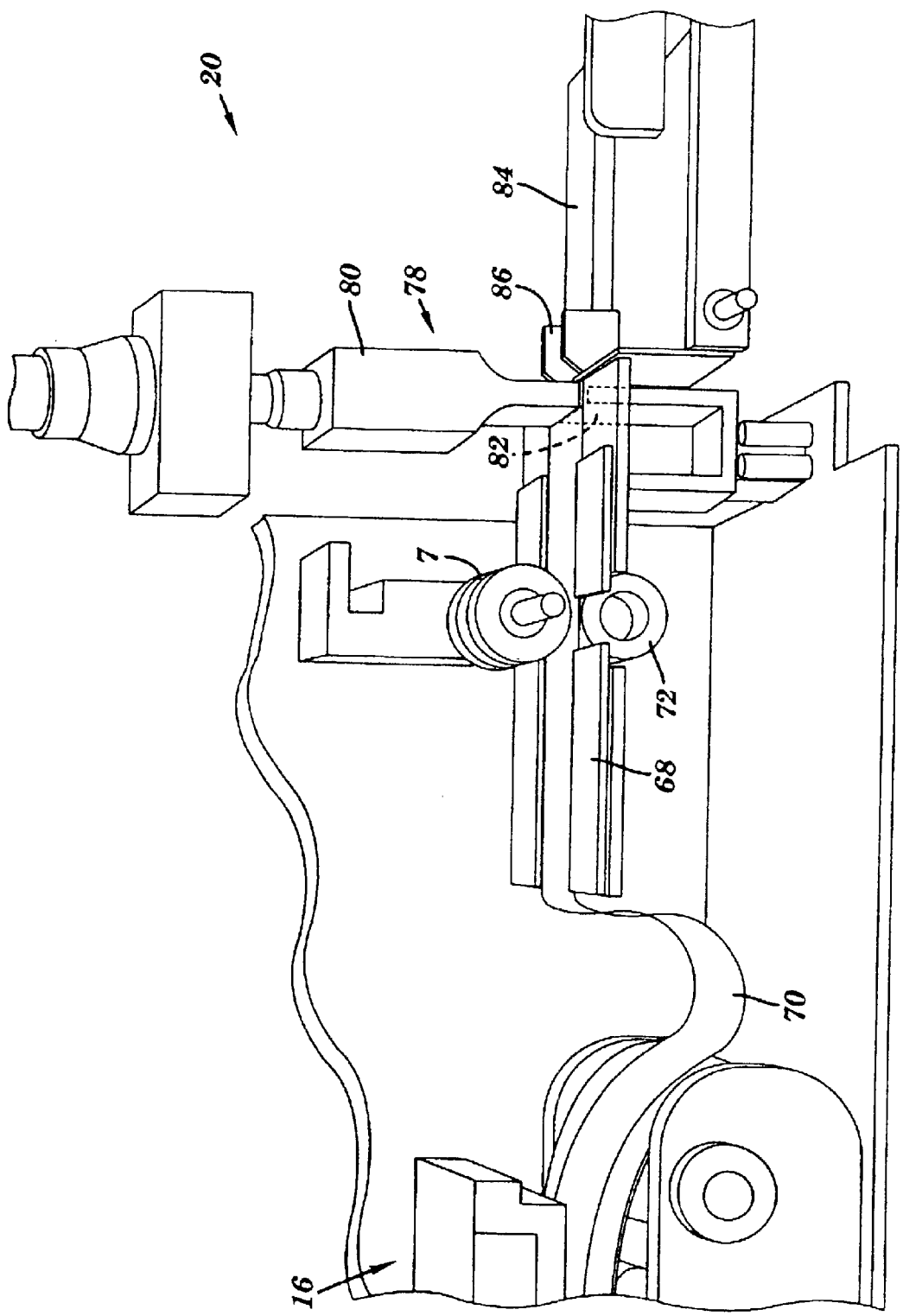
FIG. 17 is a perspective view of the indexing assembly and cutting station of the embodiment of FIG. 9.

As shown most clearly in FIG. 17, the folded pressed ribbon exits the press station and is led to the cutting station on support plate 68. A range sensor 64, shown in FIG. 10, is used to monitor the slack 70 of the material 26 between press 16 and plate support 68 and through a control unit, the speed of press 16 is trimmed to stay consistent with the advancing material and the delays set for cut time and acceleration and deceleration of the servo motor (not shown) that turns drive roller 44.

As shown in FIG. 17, upon advance of the material, downward pressure from roll 74 is dependent on material thickness, and structure. Thinner, looser structure materials require low pressure. Thicker and more stable structures of material require a higher downward pressure.

As shown in FIG. 10, to maintain the proper alignment for materials with logos and written instructions such as woven or printed labels, an observation system such as a fiber optic eye 76 is used, which reads color contrast as material advances past its read point. The material advances accelerating from a full stop. When a registration point passes under eye 76 or when eye 76 sees a color change an immediate interrupt signal is sent to the controller, at this point the servo motor, via roller 72, advances the material the distance set in the operator interface. The deceleration is calculated so that the material advance will be accurate to +/−0.05 mm. At this point the material remains stopped for the cutting, e.g., knife delay time set on the operator interface. The material then advances and follows the same sequence above.

A typical setting for the advance is the width of the label (length along loom cut edge) minus 5 mm. This number may be adjusted to influence centering of the logo. Additional adjustment can be made if necessary.

In the embodiment depicted in the figures, particularly FIG. 17, the material is cut at the cutting station 20 to form folded labels using an ultrasonic system 78 comprising a horn 80 and anvil 82. For example, ultrasonic horn 80 has sound waves moving through it at a frequency of 20 KHz. The residence of these waves can be magnified through proper booster and horn combination.

The anvil 82 is actuated at an adjustable pressure to collide with horn 80. The material 26 passes between horn 80 and anvil 82 and is exposed to very high-localized heat, cutting and sealing the material. The larger the radius on anvil 82 the larger the seal area and the more pressure required for a cut. The default delay time for the knife up is calculated and taken into account. For example, a typical delay is 70 ms, which may be adjusted if necessary to accomplish the desired results. Ultrasonic rotary dies can also be used.

The cutting station can utilize other known cutting techniques to subdivide the ribbon into individual labels. Such techniques included, for example, cold or hot shearing knives, hot fuse knives that squeeze off the product during cutting, extreme high mechanical pressure, high-pressure air, high-pressure water, laser cutting, rotary die cutters, and others.

As shown in FIG. 17, after cutting the finished label 84 proceeds to packer 86. Packer 86 then pushes the label 84 into a packing box. Packing of the cut labels can also be accomplished by bagging or placing the goods in boxes through any number of methods including single column stacks in horizontal or vertical orientation, curved stacker trays, or magazine devices in a rotary or sliding configuration.

FIGS. 24, 25 and 26b set forth a centerfold label 84 produced in accordance with the method and apparatus of the present invention. Unlike centerfold labels produced using traditional techniques, the centerfold label of the present invention has the front and back folds sealed together along edge 128.

All the components may be assembled in a single device, or may be associated together as separate components, within a system.

As discussed above, by using an alternative folding stations, the apparatus of the present invention can be used to form other varieties of folded labels. For example, FIGS. 18–22 depict modifications to the folding station of the embodiment of FIG. 9 to form "end-fold" labels (FIGS. 2–4).

As shown in FIGS. 18 and 19, the material 26 is distributed from tension roll 10 and passed through folding station 14. In this embodiment the folding station 14 is comprised of folding rods 88 and holder foot 90 that keeps the fold closed before it enters the press station 16.

The folding rods are illustrated in more detail in FIGS. 20A–20C. In FIGS. 20A–20C fold rod 92 holds unfolded material in position. Fold rod 94 begins the fold along the edges. Fold rod 96 completes the fold. Fold rods 98 and 100 work the fold in place. The folded material then enters press station 16 and is processed as above.

Figure 2:
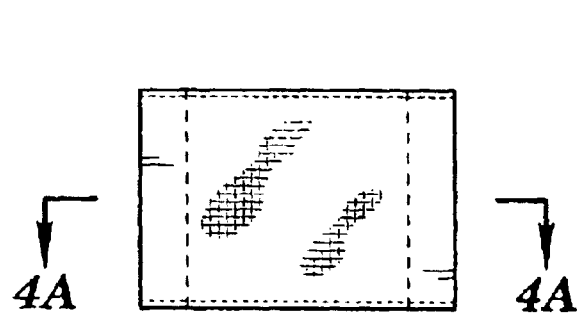
FIG. 2 is a front view of an end fold label.
Figure 3:
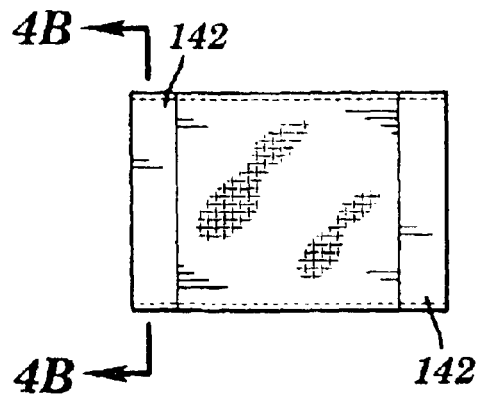
FIG. 3 is a back view of the label of FIG. 2.
Figure 4A:
FIG. 4A is a cross sectional view of the label of FIG. 2 along line 4A—4A.
Figure 4B:
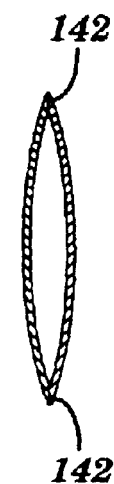
FIG. 4B is a cross sectional view of the label of FIG. 2 along line 4B—4B.
Figure 21:
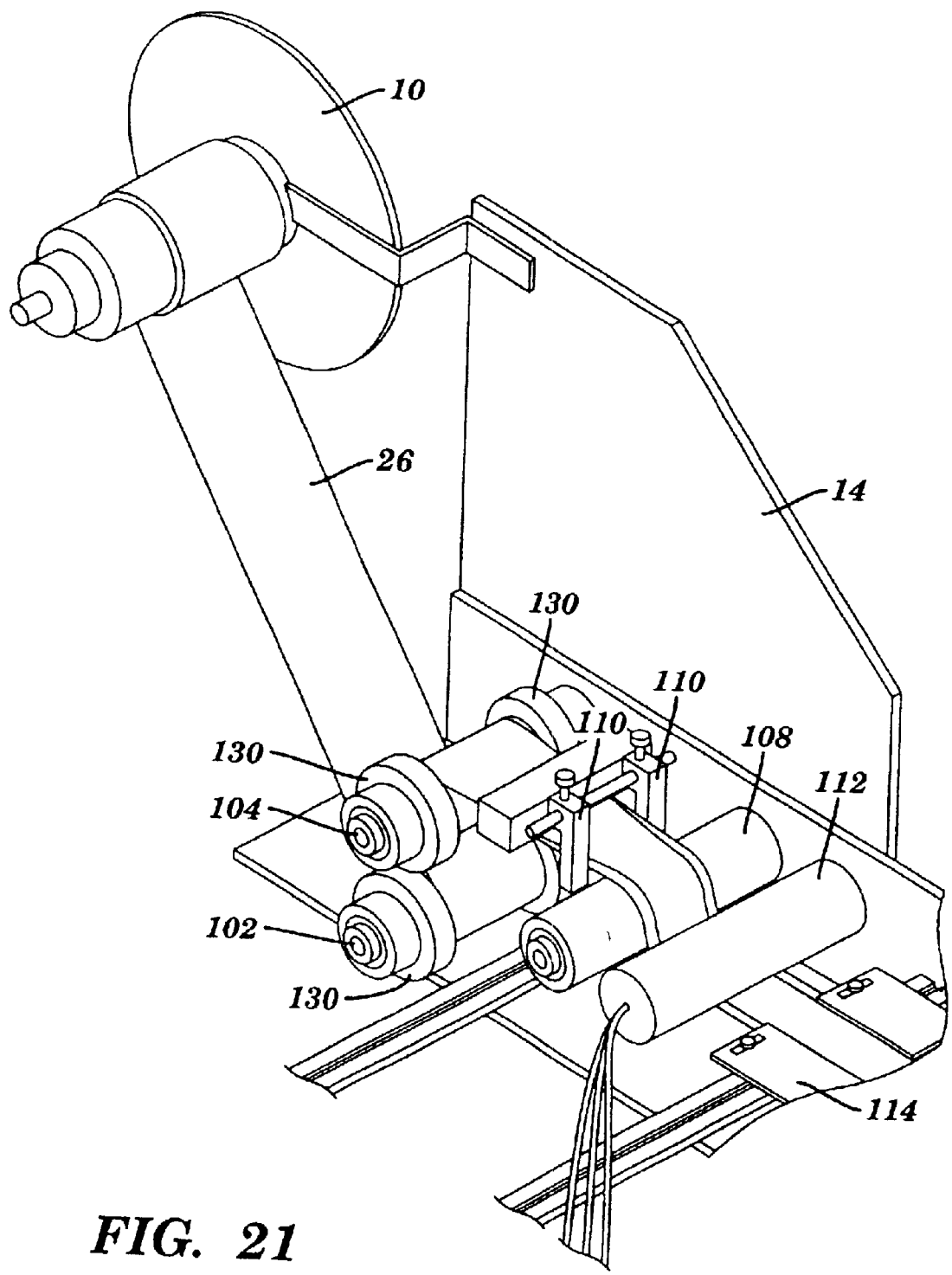
FIG. 21 is a perspective view of an alternative embodiment of the present invention.
Figure 22:
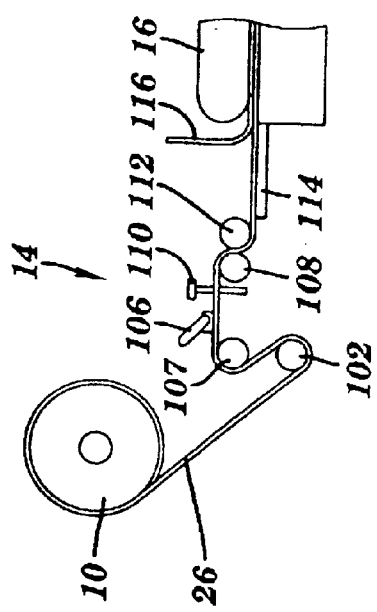
FIG. 22 is a schematical side view of the embodiment of FIG. 21.

FIGS. 21 and 22 show another modification to the folding station that can be used to form an "end-fold" label (FIGS. 2–4). As shown in FIGS. 21 and 22, the material 26 is distributed from tension roll 10 and passed through folding station 14. In this embodiment the folding station 14 is comprised of services of guide rollers 102–108 and fold pins 110. Guide rollers 102 and 104 position the ribbon of material 26. Adjustable guides 130 (FIG. 22) on rollers 102 and 104 are moved into the material edge. Guide roller 106 (FIG. 22) exerts pressure on the center of the material to prevent the ribbon from puckering in the center. Folding pins 110 fold the edges of the fabric and roller 108 holds the fold. Heat roller 112 presets the fold (100° C.–145° C.). As illustrated in FIG. 22 guide 114 holds the fold in place before the folded ribbon enters the press station 16. The press station 16 can be equipped with a hold-down spring 116 to maintain the fold in place when the press is lifted stops. The apparatus further includes a cutting station as depicted in FIGS. 9 and 17.

FIGS. 2, 3, 4A and 4B show various views of an end fold label produced in accordance with the method and apparatus of the present invention. The present invention results in front and back folds sealed together along edge 142.

Figure 5:
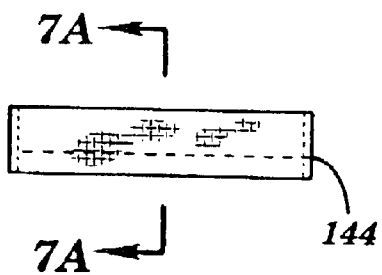
FIG. 5 is a front view of a Manhattan fold label.
Figure 6:
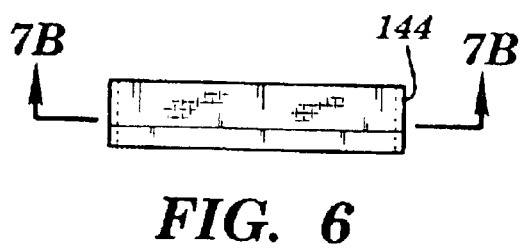
FIG. 6 is a back view of the label of FIG. 5.
Figure 7A:
FIG. 7A is a cross sectional view of the label of FIG. 5 along line 7A—7A.
Figure 7B:
FIG. 7B is a cross sectional view of the label of FIG. 5 along line 7B—7B.
Figure 27:
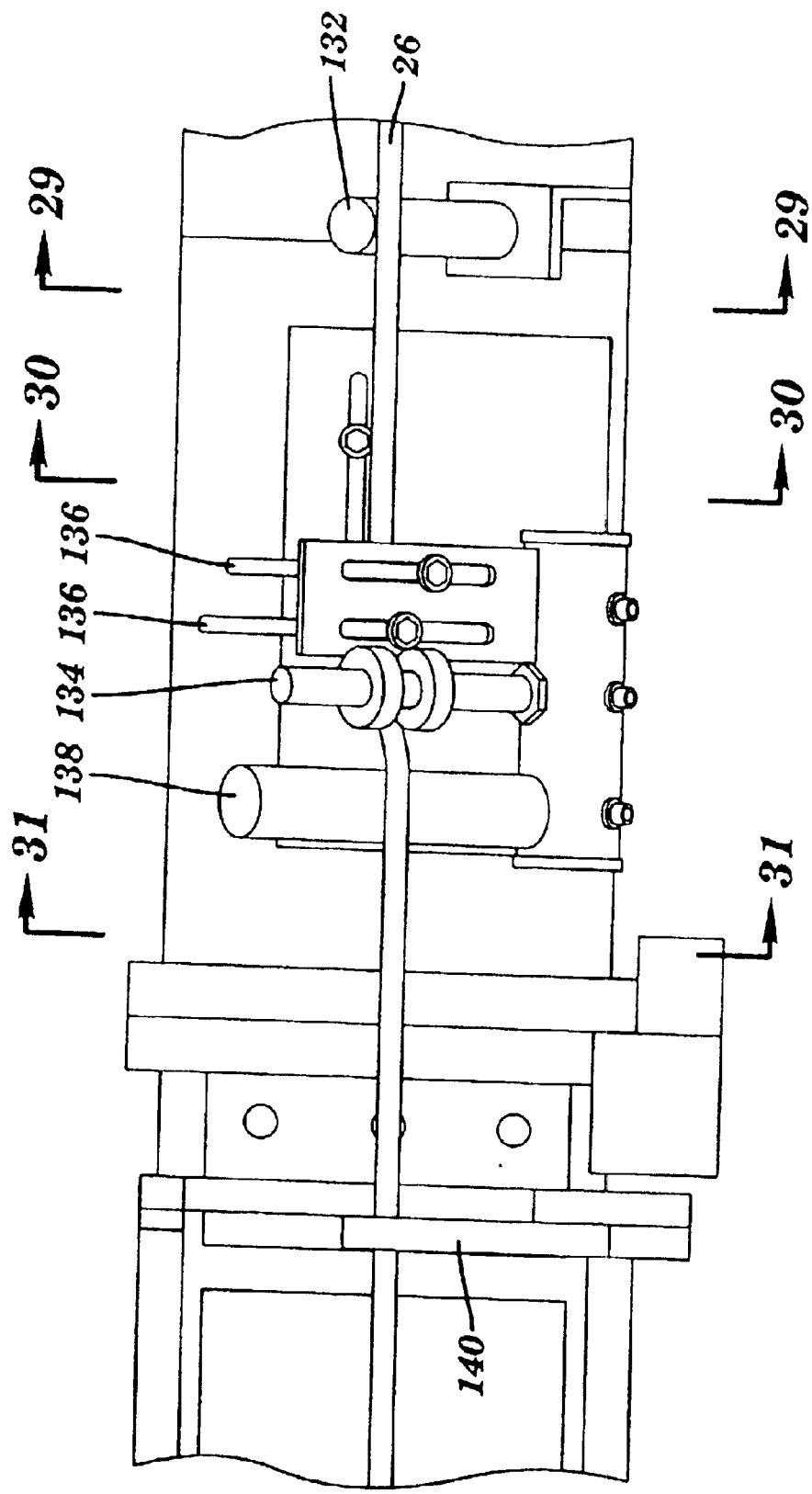
FIG. 27 is a top view of an alternative embodiment of the present invention.
Figure 28:
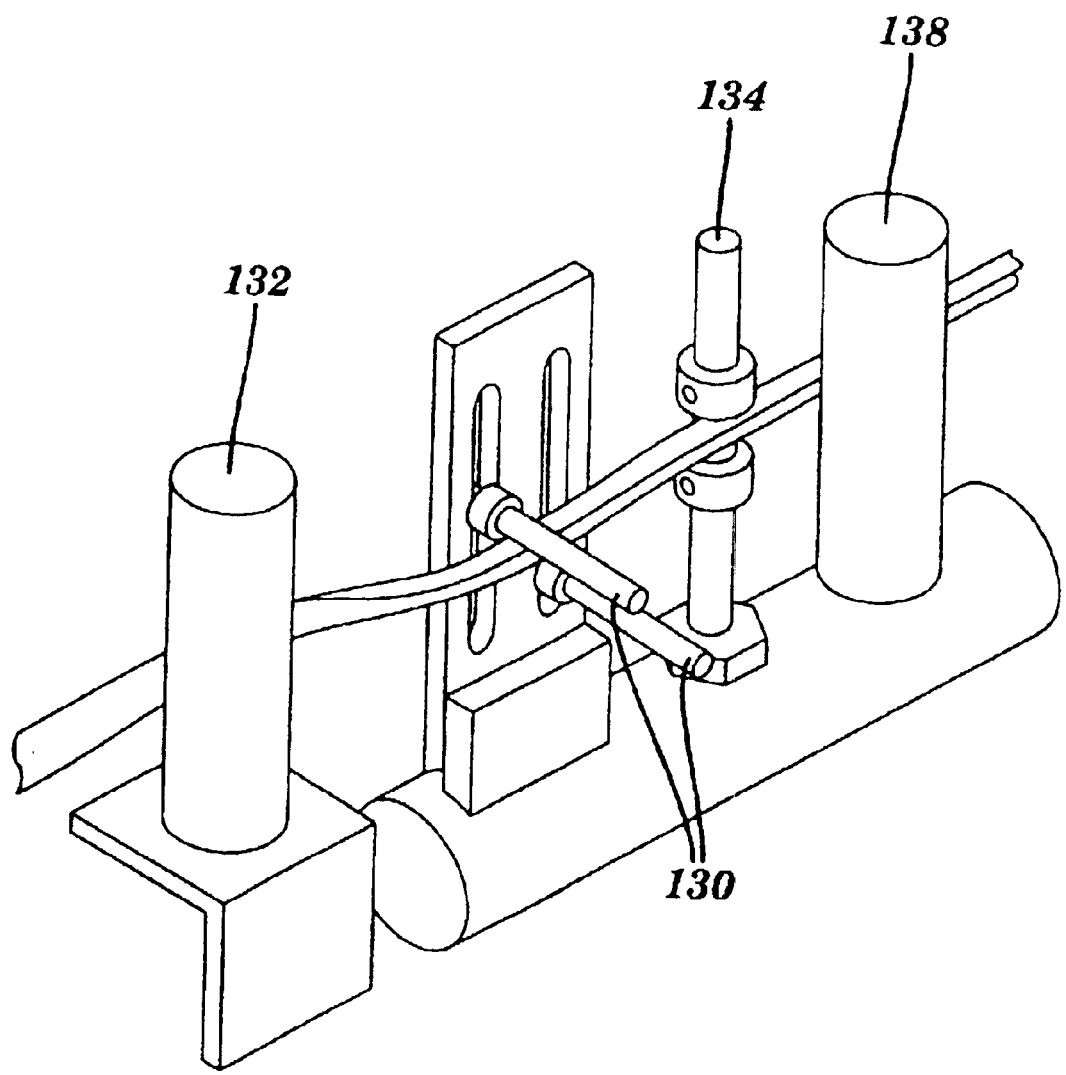
FIG. 28 is a perspective view of the reverse side of the embodiment depicted in FIG. 27.
Figure 29:
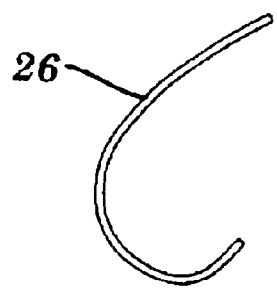
FIGS. 29, 30 and 31 are cross sectional views of ribbon 26 in FIG. 27.
Figure 30:
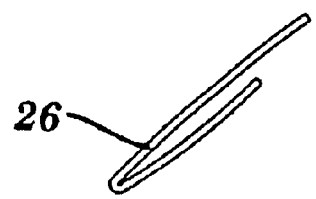
Figure 31:

FIGS. 27 and 28 depict a modification in the folding station to form Manhattan fold labels (FIGS. 5–7). In this embodiment, the folding station is comprised of several folding rods and at least one folding lens. In use, the ribbon of material 26 exits the tension let off device (not shown). The ribbon is over folded on the top edge by folding rod 132 (FIGS. 29 and 30). Through tension, the back fold rod 134 begins the top fold which folds around to the back. Guide rods 130 and 136 bring the fold into place. The folded ribbon then travels behind support rod 138 and through folding lens 140 that maintains the fold and lines up the fabric with the press station 16 (not shown). FIGS. 29, 30 and 31 show a cross section of ribbon 26 as it travels through the folding station. The apparatus further includes a cutting station as depicted in FIGS. 9 and 17.

FIGS. 5, 6, 7A and 7B depict various views of a Manhattan fold label produced in accordance with the present invention. The label is unique in that the cut sides are bonded and sealed along edge 144.

As noted above, the resultant labels have a unique smooth feel based upon the process used to make them. Furthermore, thermoplastic ribbon of labels, preferably a woven polyester, is subdivided using an ultrasonic system as part of the claimed apparatus, the labels are unique in that the cut sides are bonded or welded together as illustrated in FIGS. 2–7 and 24–26. As noted above, this bonding not only prevents the label from being skewed when sewed into a garment, but also provides the edges with a generally scratchless feel.

Figure 23:
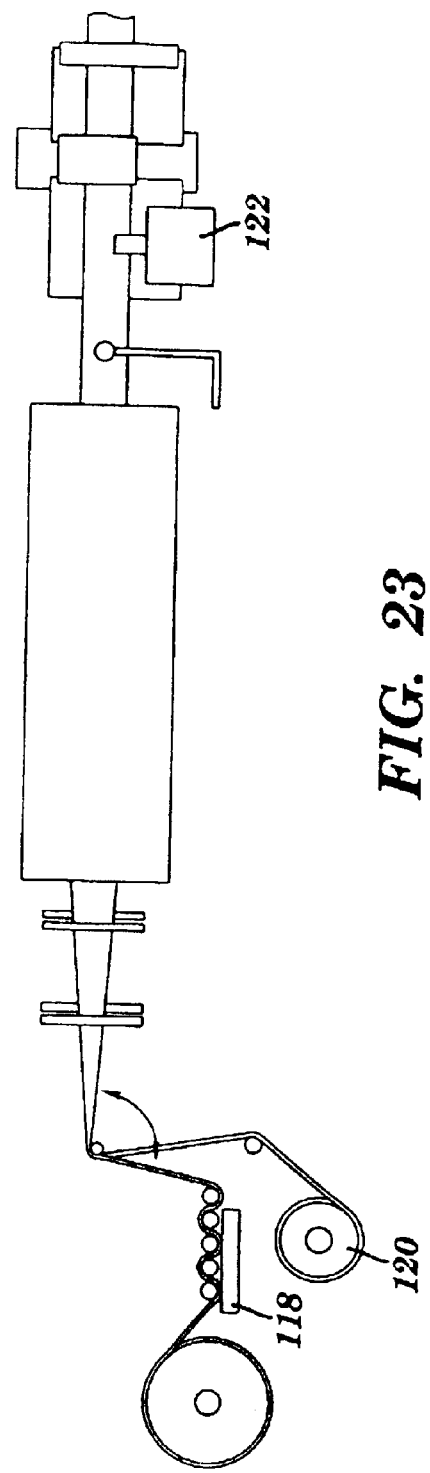
FIG. 23 is a schematical top view showing examples of positions that inventory/security devices can be inserted.

The apparatus of the invention is particularly suited for insertion of devices such as security and inventory control devices, e.g., radio frequency inventory devices (RFID) tags, into labels. RFIDs are known in the art and include that disclosed in U.S. Pat. Nos. 5,874,902; 5,874,896; 5,785,181; and 5,745,036. As illustrated in FIG. 23, such devices can be inserted at number of locations including, but not limited to locations 118, 120 and 122. Location 120 represents such devices on a reel or roll to be distributed during the fold process. Using an ultrasonic cutting system these devices can be sealed into the bonded top and bottom edges of the material. This will cause the label to be destroyed if the device is removed; thus guaranteeing the tag and label stay as one during processing. At location 122 the folded material is opened and the device is inserted at desired positions. At location 118 adhesive backed devices are be placed on the material before folding. Edge sealing can be achieved with these methods as well.

The apparatus of the present invention can be modified at any point to include various accessories. A vision system can be included to inspect the logos and image on the material as it passes. Labels with errors caused are detected and removed automatically.

Additionally, the apparatus can be modified such that the cutting station the corners of the cut material are removed to provide for heightened comfort. Further, the apparatus can be modified to ultrasonically seal the open loom cut edge giving a centerfold label, for example, three ultrasonically sealed edges and one folded edge.

Modifications of the invention herein disclosed will occur to persons skilled in the art and all such modifications are deemed to be within the scope of the invention as defined by the appended claims.

What is claimed is:

1. A method for producing individual folded labels from a ribbon of labels, said method comprising the steps of:
   (a) providing a ribbon of labels of a woven, thermoplastic material with at least one folded portion to result in a folded ribbon;

(b) subjecting the folded ribbon to sufficient heat and pressure to set the at least one folded portion; and (c) ultrasonically subdividing the ribbon into separate, individual folded labels.

2. The method of claim 1, wherein the folded labels are in a centerfold configuration.

3. The method of claim 1, further including the step of inserting a device into the folded label.

4. The method of claim 3, wherein the device is a radio frequency inventory device.

5. A label produced by the method of claim 1, 2, 3 or 4.

6. A label-making apparatus comprising:

(a) a dispenser for a ribbon of labels of a woven, thermoplastic material;

(b) a folding station positioned adjacent the dispenser, said folding station providing the ribbon of labels with at least one folded portion;

(c) a press station positioned adjacent said folding station, said press station including mechanism for linear advance of the ribbon from the dispenser through the folding station and a heated platen movably disposed above said ribbon for providing pressure and heat to ribbon; and (d) a cutting station position adjacent the press station and in communication therewith, said cutting station including ultrasonic means for subdividing said ribbon into at least one separate, individual label.

7. The apparatus of claim 6, wherein the mechanism for linear advance is a conveyor.

8. The apparatus of claim 6, further comprising a drive wheel positioned between the press station and the cutting station.

9. A method for producing individual folded labels from a ribbon of labels, said method comprising:

(a) providing a ribbon of labels with at least one folded over portion to result in a folded ribbon;

(b) subjecting the folded ribbon to sufficient heat and pressure during a continuous, uninterrupted advance, to set the fold; and (c) subdividing the ribbon into individual folded labels having cut edges, wherein the cut edges are sealed and bonded together.

10. The method of claim 9, wherein the folded labels are in a centerfold configuration.

11. The method of claim 9, wherein the folded labels are in an end fold configuration.

12. The method of claim 9, wherein the folded labels are in a Manhattan fold configuration.

13. The method of claim 9, further including the step of inserting a device into the folded labels.

14. The method of claim 9, further including the step of inserting a laminate into the folded labels.

15. The method of claim 13, wherein the device is part of a web or laminate.

16. The method of claim 13, wherein the device is a radio frequency device.

17. The method of claim 13, wherein the device is an anti-theft device.

18. A label produced by the method of claim 9, 10, 11, 12, 13, 14, 15 or 16.

19. A label-making apparatus comprising:

(a) a dispenser for a ribbon of labels;

(b) a folding station positioned adjacent the dispenser, said folding station providing the ribbon of labels with at least one folded over portion;

(c) a press station positioned adjacent said folding station, said press station;

(d) a mechanism for continuous, uninterrupted advance of the ribbon from the dispenser through the folding station and the press station;

(e) a cutting station positioned adjacent the press station, said cutting station including means for subdividing an individual label from said ribbon; and (f) an indexing mechanism positioned between the press station and the cutting station and in communication with a sensor for advancing the ribbon to the cutting station and for providing proper spacing between a cut-edge and a logo on the label.

20. The label-making apparatus of claim 19, wherein the mechanism for uninterrupted advance is a conveyor.

21. The label-making apparatus of claim 19, wherein the folding station comprises a folding rod.

22. The label-making apparatus of claim 19, wherein the dispenser is vertically adjustable.

23. The label-making apparatus of claim 19, wherein the mechanism for uninterrupted advance and the indexing mechanism are in communication with the press station.

24. A method for producing individual woven labels from a ribbon of labels of a woven, thermoplastic material, said method comprising the steps of:

(a) providing a ribbon of labels having loom cut edges with at least one folded portion parallel to the loom cut edges of the ribbon; and (b) ultrasonically subdividing the ribbon perpendicular to the loom cut edges to form individual woven labels having at least one folded edge and a plurality of ultrasonically subdivided edges, wherein the at least one folded portion is bonded together along the ultrasonically subdivided edges, said ultrasonically subdivided edges being ultrasonically sealed to form individual folded labels having said plurality of ultrasonically sealed edges and said at least one folded edge.

25. The method of claim 24, wherein the loom cut edges are ultrasonically sealed to form individual folded labels with three ultrasonically sealed edges and one folded edge.

26. The method of claim 24, wherein the folded labels are in a centerfold configuration.

27. The method of claim 24, wherein the folded labels are in an end fold configuration.

28. The method of claim 24, wherein the folded labels are in a Manhattan fold configuration.

29. The method of claim 24, further comprising the step of applying a device into the folded label.

30. The method of claim 29, wherein the device is an anti-theft device.

31. The method of claim 29, wherein the device is a radio frequency device.

32. A label produced by the method of claim 24, 25, 26, 27, 28, 29, 30 or 31.

33. A label formed from a ribbon of woven, thermoplastic material, comprising:

loom cut edges and two sides perpendicular to the loom cut edges; and at least one folded over portion orientated parallel to the loom cut edges, wherein said at least one folded portion is ultrasonically bonded together along the two sides.

34. The label of claim 33, wherein the folded label has a centerfold configuration, forming a pocket.

35. The label of claim 33, wherein the folded label has an end fold configuration.

36. The label of claim 33, wherein the folded label has a Manhattan fold configuration.

37. The label of claim 33, which further comprises a device disposed therein.

38. The label of claim 37, wherein the device is an anti-theft device.

39. The label of claim 37, wherein the device is a radio frequency device.

40. A method for producing individual woven labels from a ribbon of labels woven from a thermoplastic material, the method comprising the steps of:
   (a) providing a ribbon of labels having edges and at least one folded portion parallel to the edges of the ribbon; and
   (b) ultrasonically subdividing the ribbon perpendicular to said ribbon edges to form separate, individual woven labels having at least one ultrasonically cut edge, wherein the at least one folded portion is bonded together along the at least one ultrasonically cut edge.

41. A label formed from a ribbon of woven, thermoplastic material having edges, said label comprising two sides perpendicular to the ribbon edges and at least one folded portion orientated parallel to the edges of said ribbon, wherein said at least one folded portion is ultrasonically bonded together along the two sides.

42. A label formed from a woven ribbon of thermoplastic material having edges, said label having two sides and at least one portion folded along a folded edge, said folded portion being orientated parallel to the edges of said ribbon, wherein said at least one folded portion is ultrasonically bonded together along the two sides which are perpendicular to said folded edge.

43. A label formed of woven thermoplastic material, said label having at least one folded edge, portions of said label being located on either side of the at least one folded edge, wherein said portions are ultrasonically bonded together along an edge perpendicular to the at least one folded edge.

44. The label of claim 41, 42 or 43 comprising a device disposed within said label.

45. The label of claim 44, wherein the device is a radio frequency device or antitheft device.

* * * * *